United States Patent [19]
Lindgren et al.

[11] Patent Number: 5,835,548
[45] Date of Patent: Nov. 10, 1998

[54] CAPSULE FOR THE CONTAINMENT OF SPENT NUCLEAR FUEL AND A METHOD OF MANUFACTURING SUCH A CAPSULE

[75] Inventors: Per-Olov Lindgren, Fauske, Norway; Joakim Pettersson, Skelleftehamn, Sweden

[73] Assignee: Boliden Contech AB, Stockholm, Sweden

[21] Appl. No.: 894,697

[22] PCT Filed: Mar. 5, 1996

[86] PCT No.: PCT/SE96/00287

§ 371 Date: Aug. 26, 1997

§ 102(e) Date: Aug. 26, 1997

[87] PCT Pub. No.: WO96/27884

PCT Pub. Date: Sep. 12, 1996

[30] Foreign Application Priority Data

Mar. 8, 1995 [SE] Sweden .................................. 9500828

[51] Int. Cl.⁶ ................................ G21F 5/00; G21C 19/00
[52] U.S. Cl. ........................................ 376/272; 250/506.1
[58] Field of Search ........................ 376/272; 250/506.1, 250/507.1

[56] References Cited

U.S. PATENT DOCUMENTS

| | | | |
|---|---|---|---|
| 895,163 | 8/1908 | Cowper-Coles | 205/143 |
| 4,486,512 | 12/1984 | Tozawa et al. | 428/623 |
| 4,527,065 | 7/1985 | Popp et al. | 250/506.1 |
| 4,659,540 | 4/1987 | Cheng et al. | 376/417 |

FOREIGN PATENT DOCUMENTS 31972  1/1910  Sweden .

*Primary Examiner*—Charles T. Jordan
*Assistant Examiner*—M. J. Lattig
*Attorney, Agent, or Firm*—Burns, Doane, Swecker & Mathis, L.L.P.

[57] ABSTRACT

The invention relates to a capsule for the containment of spent nuclear fuel, wherein the capsule has a cylindrical part which comprises a steel cylinder tightly embraced by a copper layer whose thickness is of the same order as the thickness of the cylinder wall. The copper layer is a continuous layer applied electrolytically over the outer surface of the steel cylinder and has an homogenous grain structure. The invention also relates to a method of producing capsules for the containment of spent nuclear fuel, wherein a steel cylinder of predetermined length and diameter is placed as a cathode in an electrolytic cell containing a copper salt solution as electrolyte. An electric current whose strength is effective in precipitating copper is passed through the cell to the steel cylinder via one or more anodes, while rotating the cylinder, until a copper coating of predetermined thickness has been formed on the outer surface of the cylinder. The copper-coated cylinder is then heated to a temperature and for a period of time that will ensure that the whole of the inhomogeneous copper-grain structure formed in the electrolysis process is converted to a structure having a predetermined homogenous grain size. The coated cylinder is then cooled as rapidly as possible, so as to maintain essentially the copper-layer structure of homogenous grain size.

12 Claims, No Drawings

CAPSULE FOR THE CONTAINMENT OF SPENT NUCLEAR FUEL AND A METHOD OF MANUFACTURING SUCH A CAPSULE

The invention relates to a capsule for storing spent nuclear fuel, comprising a cylindrical part which includes a steel cylinder tightly embraced by a copper layer whose thickness is in the same order as the thickness of the cylinder wall. The invention also relates to a method of manufacturing such capsules for the storage of spent nuclear fuel.

It is necessary to finally store spent nuclear fuel deep in primary-rock cavities, with the fuel encapsulated or contained in capsules that are able to withstand all conceivable forms of corrosion and also be mechanically stable and prevent the emission of radio activity. Accordingly, it has been proposed in Sweden, among other countries, that the capsules shall be comprised of steel tubing embraced by a copper shell with a radiation-protective layer of lead on the inside thereof. The copper shell shall have a prescribed thickness of 50 mm and shall be capable of resisting any form of corrosion to which the capsules can conceivably be subjected over the period in which harmful quantities of radio activity still remain in the fuel. The copper shell shall also prevent the steel cylinder from being subjected to corrosion attack during this period. This requirement places very high demands on the fit between copper shell and steel cylinder and very strict specifications apply with regard to the steel-copper interface tolerances. This means that the outer surface of the steel cylinder and the inner surface of the copper cylinder that is to form the copper shell must be machined with great accuracy. Since each capsule is about 5 m in length and has a diameter of 0.9 m and weighs about 10 tonnes, the manufacture of such capsules presents significant problems with regard to the aforesaid requirements placed on the fit of the steel cylinder and copper shell and the tolerances relating thereto. The manufacture of such capsules from a steel cylinder and a copper shell as proposed in the aforesaid documents involves the following working operations:

Steel cylinder manufacture
1. Steel plate is rolled around a mandrel to a cylindrical shape and then welded.
2. The outer surface of the cylinder is machined to the highest possible degree of fineness (to meet the required steel-copper tolerance).

Copper cylinder manufacture
1. A copper blank is produced by melting and casting copper.
2. The copper blank is rolled into copper sheet having a thickness of 50 mm.
3. The sheet is curved and edge-joined in some suitable manner to form an impervious cylinder.
4. The inner surface of the copper cylinder is machined to a high degree of surface fineness that fulfills the prescribed steel-copper tolerance and so that the steel cylinder can be inserted into the copper cylinder.

It will readily be understood that these technical operations are difficult to carry out in view of the heavy weight concerned and that the operations are extremely onerous and also costly due to the fit required between steel and copper.

U.S. Pat. No. 4,527,065 proposes a spent nuclear fuel container made of cast steel or cast iron which is provided on its outer surface with a corrosion-resistant protective layer. The document proposes primarily a protected layer of ceramic, graphite or enamel because of the good corrosion properties of these materials, although it also mentions that a metal protective layer may be applied galvanically or with the aid of thermal spraying techniques. Because of the dissimilarity between the protective layer and the container body, leading to voltages between the mutually abutting surfaces, with the danger of cracks being formed and the protective layer loosening from the container body, the publication considers the application of a layer onto the large surface areas of the container to be a technically complicated and drawn-out procedure. It is therefore suggested in the document that the surface of the container is divided into several smaller sections that are partitioned-off with intermediate, outwardly projecting strips which are intended to take-up expansion stresses between protective layer and container and also to improve adhesion of the protective layer by virtue of each part surface of the protective layer being clamped firmly between the strips. Naturally, this proposed solution to the problem of storing radioactive material has not been given any weight by the authorities responsible for such storage, since protective layers that are comprised of the brittle materials referred to particularly in the proposal, for instance enamel, graphite and ceramic, must always involve a latent risk of crack formation. Furthermore, it is inconceivable to electroplate a surface in a practical and economically acceptable manner with the described technique of coating part-surfaces, i.e. to provide a non-continuous protective layer, with the intention of reducing expansion stresses. The document makes no mention and gives no indication, as to how the surface is metal-coated.

The object of the present invention is to provide a capsule and a method by which such a capsule can be produced at much lower costs than when producing the capsule from a steel and copper cylinder as discussed above, while maintaining the properties of the capsule in accordance with the aforementioned strict requirements, which, among other things, prescribe a continuous copper layer which covers the outer surface of the inwardly lying steel cylinder and having a wall thickness equal to the wall thickness of the steel cylinder. To this end, the inventive capsule and the inventive method are characterized by the features and steps set forth in respective product and method Claims. Thus, the inventive capsule has a continuous copper layer that has been applied electrolytically on the outer surface of the steel cylinder and has an homogenous grain structure.

It will immediately be seen by one skilled in this art that an electrolytically copper-coated capsule will cost much less to produce than the aforesaid capsule that is comprised of separate steel and copper cylinders, while naturally fulfilling the requirement of an intimate fit between steel and copper.

According to the inventive method, a steel cylinder of predetermined length and diameter is placed as a cathode in an electrolytic cell. Copper is precipitated in the electrolytic cell with the aid of an electrolyte consisting of a copper-salt solution through which an electric current is caused to pass the cell to the steel cylinder via one or more anodes, while rotating the cylinder. As will be understood, it is suitable to position the steel cylinder with its rotational axis parallel with the anodes, which preferably consist of copper rods of rectangular cross-section and having roughly the same length as the steel cylinder. This arrangement ensures the best possible anode-cathode uniformity during rotation of the cathode. The speed at which the cathode rotates influences the precipitation mechanism, among other things by avoidance of a stagnant layer or diffusion layer in the electrolyte adjacent the cathode surface, to the best possible extent. Fresh electrolyte flows constantly to the electrolyte bath, wherein the concentration polarization changes in accordance with the speed at which the cathode is rotated. Local growths of precipitated copper can therewith be avoided and a densely precipitated copper layer obtained, said layer being homogenous from a macroscopic aspect, although primarily a uniform protective layer. The structure of the precipitated copper can be controlled within wide limits, by adapting current strength and rotational speed of the cathode, although the structure will always be inhomogeneous with regard to both large and small grain sizes and also orientated diagonally and transversely. The supply of current to the cell is interrupted when a copper coating of predetermined thickness, e.g. 50 mm, has been applied to the outer surface of the steel cylinder. Although the electrolytically coated steel cylinder could, in principle, be used in this state as a storage capsule under certain conditions, the capsule can be given a more suitable and more homogenous structure by subjecting it to a subsequent heat-treatment process.

In this treatment, the steel cylinder coated electrolytically with copper is heated to a temperature and for a period of time of the magnitude necessary to ensure that the whole of the inhomogeneous, disordered copper-grain structure obtained in the electrolytic precipitation process will be converted to a more ordered structure having a predetermined, optimally homogenous grain size. The heated copper-coated steel cylinder is then cooled as quickly as possible, so as to maintain generally the predetermined, homogenous grain structure obtained by the heating process.

In the present context, an optimal grain structure with regard to both the actual grain size and grain homogeneity implies a grain size which suits the properties of the underlying steel with regard to mechanical and strength properties, such as tensile strength, therewith imparted to the copper layer. The problems earlier described (U.S. Pat. No. 4,527,065) associated with applying a protective layer to steel cylinders for the storage of radioactive material have been effectively overcome by electrolytically coating the cylinder with a metallic protective layer, despite the entire cylinder being coated with a protective layer by a combination of electrolysis and subsequent heating-rapid cooling of the layer to achieve a metallic protective layer whose structure is suitable for coaction with the steel.

As before mentioned, the precipitation of copper on the cathode in the electrolytic cell is preferably effected with a copper anode that dissolves successively. However, precipitation can also be effected by electro winning with indifferent anodes. In electrolysis using copper anodes, the copper salt solution may be an acid solution or a cyanide or ammonia solution, while a copper sulphate solution is preferred in the case of the electro winning process. Any known indifferent anode material for electro winning can be used when practicing the inventive method, although it is preferred to use a lead anode. Theoretically, it is not possible to coat the inner surface of the steel cylinder with copper in the precipitation process, due to the phenomenon normally provided by a Faraday cage, although in practice precipitation on the inside of the cylinder cannot always be avoided. This problem can be solved by coating the inner surface of the steel cylinder with a non-conductive layer prior to placing the cylinder as a cathode in the cell. However, greater preference is given to closing-off one circular end of the cylinder by welding a steel bottom thereon to, so as to prevent electrolyte from entering the interior of the cylinder, provided that the open end is held above the surface of the electrolyte. In addition to avoiding the precipitation of copper onto the interior surface of the cylinder, this arrangement also reduces the rotating cathode mass. It may also be suitable to add inhibitors to the electrolyte, for instance thiocarbamide.

According to one preferred embodiment of the inventive method, a capsule is produced by manufacturing a steel cylinder with a length of about 5 m, a diameter of about 0.9 m, and a wall thickness of about 50 mm, as in the case of the earlier proposed method using two cylinders, one made of steel and the other made of copper. In the case of the inventive method, it is not necessary to subject the cylinder to rigorous treatment to obtain surface fineness, and rough working of the surface and possible pickling of the cylinder may well suffice. The steel cylinder is then lowered in a vertical position into a treatment tank containing copper sulphate solution, which functions as an electrolyte. Vertically arranged in the tank are one or more copper anodes, to which electric current is delivered. The anodes will suitably be in the form of rectangular copper rods having a length of 5 m and placed at about 100 mm from the surface of the cylinder. When the steel cylinders have bottom plates welded thereto, the bottom plates are lowered first and the upper end of the cylinder is kept above the surface of the electrolyte. Additional anodes may, in this case, be placed beneath and parallel with the bottom plate and at a distance of about 100 mm therefrom. The steel cylinder is connected as a negative pole (cathode) and is caused to rotate about its vertical longitudinal axis in the electrolyte bath. Prior to lowering the steel cylinder into the treatment tank, the inner surface of the cylinder may be protected by applying an appropriate insulating layer thereto, for instance a resin layer. An electric current having an active strength adapted for copper precipitation purposes is passed through the anode and out to the electrolyte, wherewith copper ions in the electrolyte will be transported to the cathode surface and there precipitated as copper metal, while copper is dissolved at the anode and transported to the electrolyte. When a desired copper layer of about 50 mm has been obtained, which takes about 50 calendar days, the cylinder is removed from the treatment tank and placed horizontally in a furnace chamber, where the cylinder is heated suitably to a temperature of about 750°–800° C. for about 2–3 hours. The cylinder is heated in an inert atmosphere, by supplying pure nitrogen gas or argon to the furnace chamber. After heating the cylinder to the aforesaid temperature, the cylinder is cooled rapidly by spraying nitrogen onto the cylinder through a plurality of nozzles placed above the cylinder, and also through nozzles directed through the cylinder opening and into the cylinder interior.

After being filled with spent nuclear fuel, the capsule is completed by screwing a steel lid into an internal screwthread, which suitably has a thread depth of 10 mm and a length of 100 mm. A copper plate having a thickness of about 50 mm and a labyrinth seal in the cylindrical outer copper layer of the capsule is then welded onto the steel lid.

A very rough estimate of the work and the process costs of the two methods of producing copper capsules described above show that a capsule produced by producing the copper shell electrolytically in accordance with the invention is only about 20% of the cost involved in producing a capsule in accordance with the method originally proposed, using two separate cylinders which are combined to form a capsule with the copper cylinder outermost.

We claim:

1. A capsule for the containment of spent nuclear fuel and having a cylindrical part which includes a steel cylinder that is tightly embraced by a copper layer whose thickness is in the same order as the thickness of the cylinder wall, characterized in that the copper layer has been applied electrolytically as a continuous layer over the outer surface of the steel cylinder and that the copper layer has a homogenous grain structure.

2. A method of producing capsules intended for the containment of spent nuclear fuel, characterized by placing a steel cylinder of predetermined length and diameter as a cathode in an electrolytic cell having a copper salt solution as electrolyte, passing through the cell to the steel cylinder, via one or more anodes, an electric current whose strength is active in precipitating copper, while rotating the cylinder and until a copper coating of predetermined thickness has been formed on the outer surface of said cylinder, heating the copper-coated steel cylinder to a temperature and for a period of time that will ensure that the whole of the inhomogeneous copper-grain structure formed in the electrolysis process is converted to a structure having a predetermined homogenous grain size, and cooling the coated cylinder as quickly as possible so as to maintain essentially a copper layer structure of homogenous grain size.

3. A method according to claim 2, characterized by using one or more copper rods placed parallel with the longitudinal axis of the steel cylinder as anodes.

4. A method according to claim 3, characterized in that the copper salt solution is a copper sulphate solution.

5. A method according to claim 4, characterized by heating the steel cylinder to a temperature of at least about 750° C.

6. A method according to claim 5, characterized by cooling the heated cylinder with liquid nitrogen.

7. A method according to claim 2, characterized in that the copper salt solution is a copper sulphate solution.

8. A method according to claim 3, characterized by heating the steel cylinder to a temperature of at least about 750° C.

9. A method according to claim 2, characterized by heating the steel cylinder to a temperature of at least about 750° C.

10. A method according to claim 4, characterized by cooling the heated cylinder with liquid nitrogen.

11. A method according to claim 3, characterized by cooling the heated cylinder with liquid nitrogen.

12. A method according to claim 2, characterized by cooling the heated cylinder with liquid nitrogen.

* * * * *